E. McCARRELL.
SAMPLE DISPLAYING DEVICE.
APPLICATION FILED DEC. 17, 1915.
Reissued Aug. 1, 1916.
14,178.
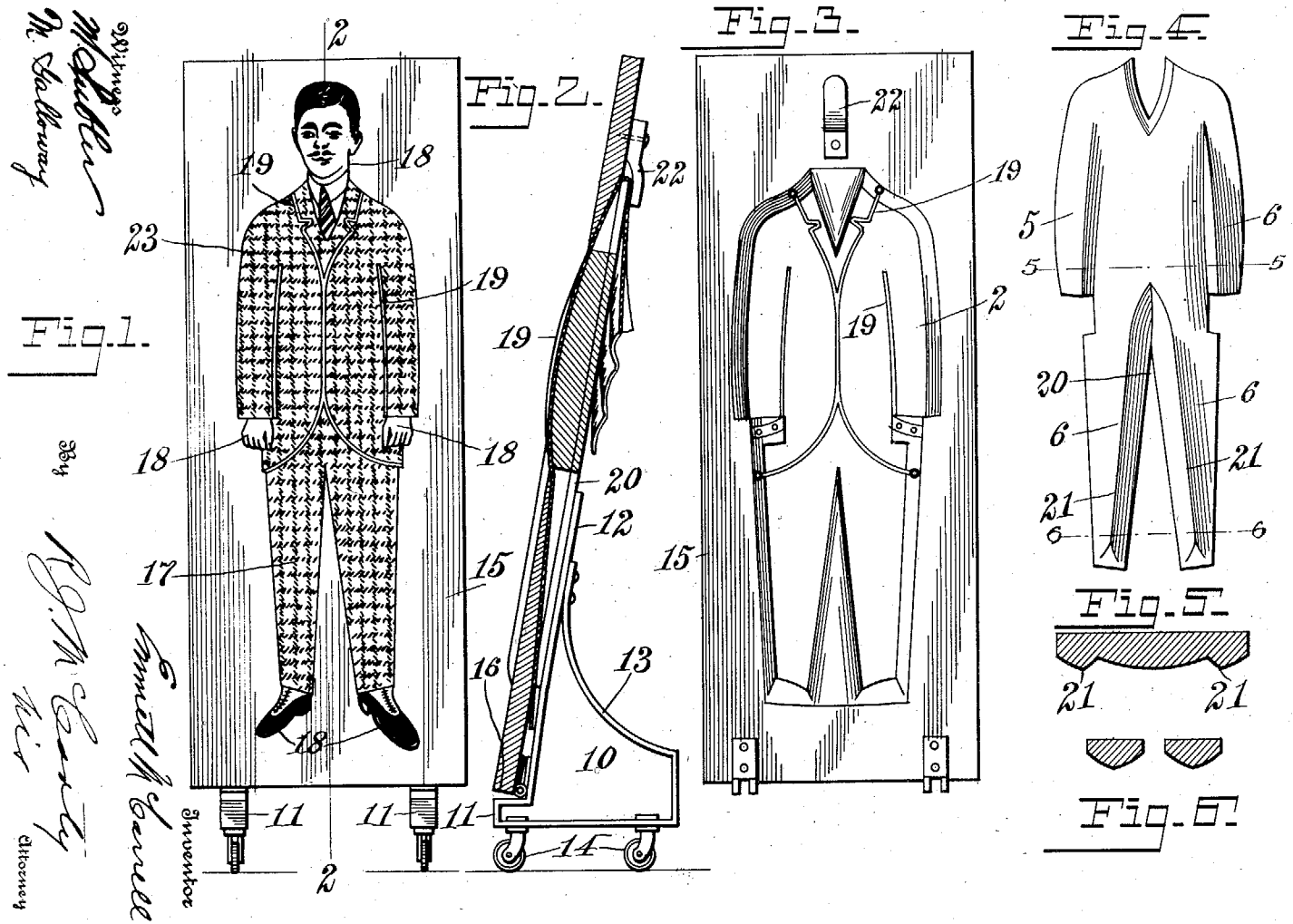
Witness
M. Lubler
M. Galloway
Inventor
Emmett McCarrell
By R. J. McCarty
his Attorney

UNITED STATES PATENT OFFICE.

EMMETT McCARRELL, OF BEDFORD, INDIANA.

SAMPLE-DISPLAYING DEVICE.

14,178. Specification of Reissued Letters Patent. Reissued Aug. 1, 1916.

Original No. 1,119,087, dated December 1, 1914, Serial No. 804,414. Application for reissue filed December 17, 1915. Serial No. 67,483.

*To all whom it may concern:*

Be it known that I, EMMETT McCARRELL, a citizen of the United States, residing at Bedford, in the county of Lawrence and State of Indiana, have invented certain new and useful Improvements in Sample-Displaying Devices, of which the following is a specification.

The invention relates to sample displaying devices and has for an object to provide means for displaying cloths or goods when in the bolt to a prospective purchaser of a suit of clothing, in a manner that will convey to the prospective purchaser the appearance of the cloth or goods when made into the suit.

The invention contemplates, among other things, the provision of a device whereon the cloths or goods may be readily and quickly arranged to appear as if they were made up and were on the person of a wearer; the representations of the goods will appear in relief and will have the effect of being actually applied to the body of a person, the edges of the upper garment appearing as the finished suit of clothes.

In the further disclosure of the invention, reference is to be had to the accompanying drawings forming part of this specification, and in which similar characters of reference denote corresponding parts in the several views, and in which—

Figure 1 is a front elevation of the device with goods displayed as in a suit made up and on the person of the wearer; Fig. 2 is a vertical sectional view taken on the line 2—2 of Fig. 1; Fig. 3 is a rear elevation of the framing member removed from the base or standard; Fig. 4 is a front elevation of the backing removed from the base or standard; Fig. 5 is a horizontal transverse sectional view taken on the line 5—5 of Fig. 4; and Fig. 6 is a horizontal transverse sectional view taken on the line 6—6 of Fig. 4.

Referring more particularly to the drawings, I provide a base or stand 10, preferably made of strap-like metal to form forwardly projecting stop flanges 11, and rearwardly inclined uprights 12 secured near their free upper ends by suitable braces 13 forming a part of the base or stand. The said base is carried or swiveled on casters 14 so that the same can be conveniently rolled or pushed over a floor to arrange the device in exhibiting position before the prospective purchaser.

It will be understood that the form of base or stand above described is one of the many suitable ways of supporting the display apparatus in convenient position. The said device may, however, be conveniently manipulated on other forms of supports or with no stand or base at all.

Mounted to swing on the lower portions of the uprights 12 is a framing member 15 adapted to have its lower edge 16 abut against the forwardly projecting flanges 11, when the said framing member is swung forwardly upon the base 10, so that the forward swinging movement of the framing member will be limited by the flanges 11 and prevent the base from toppling over. The framing member 15 is preferably of a rectangular configuration and has a cut-out portion 17 simulating the general configuration or outline of a suit of clothes on a wearer. Representations 18 of the human face, hands and feet, as well as collar and necktie and shirt front, are placed in their proper positions relative to the opening in the framing member 15 to conform to the cut-out portion 17 thereof, as clearly shown in Fig. 1. Mounted on the framing member are wire-like members 19 which represent the edges of the upper garment throughout the front, upper and lower portions thereof, giving the appearance of the usual binding or finished seam on the lapels and front edges of the garment. These wire-like members 19 are suitably secured to the framing member over the opening therein so that when the fabric is forced within the opening, in a manner to be presently described, the said wire-like frame will occupy a position in the front of the fabric.

A backing or form 20 coöperates with the opening in the framing member 15 and is insertible in said opening from the rear when the fabric is placed over said form. This backing or form 20 is rigidly supported on the uprights 12 and is preferably made of light material such as wood, papier-mâché, or pressed steel, and when given the proper formation it resembles the general outline of a person's body, with the configuration of the backing being similar to that of the cut-out portion 17 of the framing member, so that the said backing can fit into the said cut-out portion and carry the fabric with it. When the said backing or form is thus inserted, the result is as is shown in Fig. 1, the wire frame producing an outline effect which represents the edge of the coat and the face, hands and feet appearing on the framing member, coöperating with the general scheme of illustrating a tailor made suit of clothing on a person. The design of the backing or form is shown in Fig. 4, and by referring also to Figs. 5 and 6, it will be understood that the front surface thereof has a series of integral portions 21 set out in relief to indicate the lines of creasings of the suit as the same will appear when actually made up. A locking member of any preferred type is mounted to swing upon the rear face of the framing member 15 and is indicated by the numeral 22, said locking member being adapted for engagement with the backing or form 20 to hold the same rigid when coöperating with the framing member to exhibit the garment, as in Figs. 1 and 2.

In the use of the structure described, I will assume that the prospective purchaser of a suit of clothes desires to know how the goods or cloth 23 will look when made up into a suit. To accomplish this requirement the locking member is disengaged from the backing or form and the framing member is swung forwardly to lie in spaced relation to the backing member and to provide sufficient space to permit of the insertion of the goods 23 between the framing member and the backing or form. When this has been done the framing member is swung back to its normal position thus causing the goods to appear through and extend into the cut-out portion 17. The locking member having been reëngaged with the backing or form 20, it will be apparent that the portions 21 of the backing or form projecting into the cut-out portion 17 of the framing member will fold or crease the goods covering the same so that the ends will stand out in relief and have the defined lines of a finished suit as it would appear on the body of a person, and the wire members 19 lying in front of the goods will complete the resulting simulation by clearly defining those portions of the garment which are adapted to represent the sleeves, lapels, collar and front portions of the coat or of the garment. Thus, it will be understood that the head, hands and feet representations 18 on the framing member 15, and which as a whole will represent a mounting, taken in conjunction with the goods or fabric 23, set forth as mentioned, will present a figure having the appearance of a person attired in a tailored suit, and in which various parts of the garment will appear as they would when actually made up and covering the body of a person.

Having described my invention, I claim:

1. In a device of the character specified, a framing member provided with an opening outlining the form of a human body, a form member adapted to project into said opening and to carry a fabric over the front of said form member into said opening, a wire frame secured to the framing member over the opening therein and adapted to lie in front of the fabric so projected through said opening over said form member, said framing member representing in conjunction with the fabric and form member supporting the same a person clothed in a tailor-made suit, the wire frame coöperating in representing the front or free edges of the upper garment.

2. In a device of the character specified, a framing member having an opening therein outlining the form of a human figure, a form member representing the body, arms and legs of a human figure and having a marginal configuration which matches the opening in the framing member, said form member being adapted to enter the opening in the framing member and to carry a fabric over the front thereof and to thereby represent in said opening a clothed human figure, a wire frame mounted on said framing member in front of said opening and representing the free edges of the upper garment.

3. In a sample displaying device, the combination with a base, of a backing adapted to have fabric placed over its face, said backing having portions thereof formed in relief on the face of the backing, a framing member having a cut-out portion simulating the outline of the body, with the portions of the backing in relief adapted to lie in the cut-out portion of the framing member, and wire-like members on the framing member and lying within the plane of the cut-out portion to press against the fabric so that those portions of the fabric covering the portions in relief on the backing will be pressed forwardly adjacent the said members.

4. In a sample displaying device, the combination with a base, of a framing member mounted to swing thereon and provided with a cut-out portion simulating the outline of the body, a backing carried by the base and having portions thereof set out in relief on the face of the backing, with the said portions adapted to project into the cut-out portion of the framing member, said backing being adapted to have a fabric placed over its face and be visible through the cut-out portion of the framing member, and means on the framing member and lying within the plane of the cut-out portion, said means being adapted to press against the fabric so that the portions of the fabric covering the raised portions on the face of the backing will stand out in relief adjacent the said means.

5. In a device of the character specified, a backing or form member adapted to have a fabric placed over its front face, and having portions formed in relief on the face thereof, a framing member having a cut-out portion simulating the outline of a human body with said portions of the backing in relief adapted to lie in the cut-out portion of the framing member, and wire members on the framing member projecting in front of the cut-out portions in said framing member and adapted to press against the fabric and to outline the front edges of the upper garment.

EMMETT McCARRELL.

Witnesses:
R. J. McCarty,
Mellie Galloway.